(12) United States Patent
Patchen et al.

(10) Patent No.: US 7,594,103 B1
(45) Date of Patent: Sep. 22, 2009

(54) MICROPROCESSOR AND METHOD OF PROCESSING INSTRUCTIONS FOR RESPONDING TO INTERRUPT CONDITION

(75) Inventors: Paul J. Patchen, Arlington, TX (US); William V. Miller, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 1486 days.

(21) Appl. No.: 10/294,578

(22) Filed: Nov. 15, 2002

(51) Int. Cl.
G06F 9/30 (2006.01)

(52) U.S. Cl. ....................................................... 712/244
(58) Field of Classification Search ................... 712/205
See application file for complete search history.

(56) References Cited

U.S. PATENT DOCUMENTS

| | | | | |
|---|---|---|---|---|
| 3,573,852 A | * | 4/1971 | Watson et al. | 718/107 |
| 6,014,709 A | * | 1/2000 | Gulick et al. | 709/235 |
| 6,092,186 A | * | 7/2000 | Betker et al. | 712/233 |
| 6,269,439 B1 | | 7/2001 | Hanaki | |

OTHER PUBLICATIONS

Hennessy, John L. and David A. Patterson. Computer Architecture: A Quantitative Approach. Second Edition. Morgan Kaufmann: 1990. p. 130.*
Booth, Taylor L. Introduction to Computer Engineering: Hardware and Software Desgin. Third Edition. John Wiley: 1971. p. 249.*
Wakerly, John F. Digital Design: Principles and Practices. Third Edition. Prentice Hall: 2000. p. 20.*

* cited by examiner

*Primary Examiner*—Eddie P Chan
*Assistant Examiner*—Robert E Fennema
(74) *Attorney, Agent, or Firm*—Finnegan, Henderson, Farabow, Garrett & Dunner LLP

(57) ABSTRACT

A pipeline processing microprocessor includes a storage unit for storing instructions and a fetch unit for requesting and fetching an instruction from the instructions in the storage unit. Upon an interrupt condition, the fetch unit eliminates from a request queue a previously requested instruction that precedes the interrupt condition.

20 Claims, 6 Drawing Sheets

MICROPROCESSOR AND METHOD OF PROCESSING INSTRUCTIONS FOR RESPONDING TO INTERRUPT CONDITION

I. BACKGROUND OF THE INVENTION

A. Field of the Invention

The present invention relates to pipeline processing, and more particularly to a microprocessor with a pipeline circuit that is capable of usurping a waited pipeline bus request.

B. Description of the Prior Art

Pipeline processing is a way of processing information. A pipeline consists of different units that perform tasks on information. Information is worked on by each unit in the pipeline. After a first unit has completed its work on the information, the first unit passes the information to another unit. The work done on the information is not completed until it has passed through all the units in the pipeline.

The advantage of pipelining is that it increases the amount of processing per unit time. This results in instructions being handled in less cycles.

Although the pipeline process increases the speed in which an instruction is processed, it has problems handling vector or branch instructions. A branch or vector instruction requires a microprocessor to request a sequence of instructions that differs from instructions that have already been requested. This results in instructions in the pipeline that are no longer needed.

In FIG. 1, an exemplary diagram of a prior art microprocessor 100 using pipeline processing is shown. The Fetch Unit 110 is communicatively connected to the Decode Unit 115, the Vector Request signal 165, the Branch Request signal 170 and the Bus Interface Unit ("BIU") 135. The Decode Unit 115 is communicatively connected to the Execute Unit 120. The Execute Unit 120 is communicatively connected to the Data Memory Access Unit 125 and the Fetch Unit 110. The Data Memory Access Unit 125 is communicatively connected to the Register Write-Back Unit 130 and a Memory 160. The Register File 105 is communicatively connected to the Fetch Unit 110, Decode Unit 115, Execute Unit 120, and Register Write-Back Unit 130.

The BIU 135 utilizes a Memory Request 140, also referenced as a Fetch Request 140, Address_Size_Control lines 145, an Instruction bus 150 and a Wait line 155 to communicate with the Fetch Unit 110.

The BIU 135 is memory storage used to obtain and hold prefetched instructions. The Fetch Unit 110 requests and fetches instructions from the BIU 135. The Decode Unit 115 decodes the fetched instructions. The Execute Unit 120 executes the decoded instructions. The Data Memory Access Unit 125 accesses Memory 160. The Register Write-Back Unit 130 writes results received from the Data Memory Access Unit 125 into the Register File 105. The Vector Request signal 165 indicates when a vector has occurred. The Branch Request signal 170 indicates when a branch has occurred.

The Microprocessor 100 typically receives instructions (n to n+9, shown in FIG. 2) as inputs. The Fetch Unit 110 requests and grabs instructions from the BIU 135. As described previously, the BIU 135 obtains and stores instructions. The BIU 135 serves to reduce the amount of time the Fetch Unit 110 takes to obtain an instruction. By having the instructions available at the BIU 135, the Fetch Unit 110 does not have to spend additional cycles searching for an instruction.

When the Fetch Unit 110 grabs an instruction, it also requests another instruction. Requesting an instruction before it is needed is known as prefetching. By requesting that the BIU 135 prefetch an instruction, the Fetch Unit 110 can further reduce the amount of time it has to wait to receive an instruction. After the Fetch Unit 110 has requested an instruction, the BIU 135 will either provide the valid instruction or wait the Fetch Unit 110 during subsequent clock periods.

Whenever a requested instruction is not immediately available to the Fetch Unit 110, the BIU 135 waits the Fetch Unit 110 by driving the Wait signal 155 active. This indicates to the Fetch Unit 110 that it needs to wait to receive the request and to wait before making any additional prefetch requests. However, the Fetch Unit 110 will have made a second request, before receiving the Wait signal 155. Therefore, two requests will be made before the Wait signal 155 is sampled as being active by the Fetch Unit 110.

When the Fetch Unit 110 receives instruction n from the BIU 135, the Fetch Unit 110 next requests instruction n+1. At the next clock cycle, if the Wait signal 155 has not been driven active by the BIU 135, n+2 is requested by the Fetch Unit 110. The Fetch Unit 110 receives n+1 and the Decode Unit 115 receives n. This process will continue throughout the Microprocessor 100 until n has passed through each unit and a result is written to the Register File 105.

If the Wait signal 155 is driven active from the BIU 135 during this process, it will force the Fetch Unit 110 to wait before it receives the requested instruction. This momentarily stops the flow of instructions through all the units.

As described earlier, instructions proceed through the units in the Microprocessor 100. Sometimes an instruction that arrives at the Execute Unit 120 is a branch or vector instruction. As discussed previously, a branch or vector instruction requires the Microprocessor 100 to request a different sequence of instructions. Therefore, any instruction in the pipeline that had been prefetched by the pipeline before the vector or branch instruction occurs is now unneeded.

A problem with pipeline processing is that there is no way to prevent the unneeded prefetched instruction from proceeding through the pipeline. These unneeded instruction will slow down the processor since they still have to be processed, even though they are unneeded.

In FIG. 2, a timing chart illustrating the processing that occurs in the Microprocessor 100 in the absence of a vector or branch instruction. The clock 205 shows the clock cycles, while the Address, Size, Control signals 145 indicate the associated instruction request information signals. Fetch Request 140 identifies which instruction has been requested by the Fetch Unit 110. Wait 155 indicates when the BIU 135 needs additional time to obtain the instruction. Instruction bus 150 indicates when the valid instruction has been fetched by the Fetch Unit 110.

As can be seen in the FIG. 2, each Fetch Request 140 that is made is fetched on the next clock cycle except on instruction n+4. At n+4, a Wait signal 155 is requested while the BIU 135 looks for n+4 and n+5. Therefore, although n+4 is requested on clock cycle five, the instruction is not completely received by the Fetch Unit 110 until clock cycle seven. Since instruction n+4 received an active Wait signal 155, Fetch request 140 n+5 is also delayed an additional clock period before it can be obtained by the Fetch Unit 110.

In FIG. 3, a timing chart illustrates how an unneeded prefetched instruction is typically handled by prior art Microprocessor 100. Vector Indicated 305 identifies on which clock signal a vector occurred. As was discussed previously, when a vector or branch instruction occurs, new instructions are required from the BIU 135. A previously fetched instruction is no longer needed, since the vector or branch instruction now requires new instructions.

In FIG. 3, instruction n has been requested by the Fetch Unit 110. While the BIU 135 is working on obtaining n, the Fetch Unit 110 requests n+1. The BIU 135 sends a Wait signal 155 to the Fetch Unit 110 to indicate that it is working on n. Therefore, no additional instructions beyond n+1 may be requested. At clock cycle five, n has been fetched and n+1 is still being worked on. However at clock cycle three, a vector occurred and new instructions will have to be requested from the BIU 135. At clock cycle six, the new instruction V has been requested. Since the vector occurred, instruction n+1 is no longer needed. The next instruction that is needed is V. However, the Microprocessor 100 in FIG. 1 will fetch the unneeded instruction n+1 before it fetches the instruction V. The instruction n+1 slowed down the Microprocessor 100 since it had to be processed, even though it was unneeded.

One solution that has developed to address this problem is speeding up the Execute Unit of a pipeline by obtaining both possible next instructions, one instruction in case there is a branch and one instruction in case there is no branch. This solution, however, requires that both instructions be obtained simultaneously.

Embodiments consistent with the present invention are directed at overcoming one or more of the aforementioned problems.

II. SUMMARY OF THE INVENTION

In accordance with the purpose of the invention, as embodied and broadly described herein, the embodiments consistent with the principles of the present invention comprise a pipeline processing microprocessor comprising: a storage unit for storing instructions; and a fetch unit for requesting and fetching an instruction from the instructions in the storage unit, wherein upon an interrupt condition, the fetch unit removes a previously requested instruction that precedes the interrupt condition.

In accordance with the purpose of the invention, as embodied and broadly described herein, the embodiments consistent with the principles of the present invention comprise a method of processing instructions comprising: storing instructions; fetching and requesting the stored instructions; and upon an interrupt condition, removing a previously requested instruction that precedes a requested instruction.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

III. BRIEF DESCRIPTION OF THE DRAWINGS

IV. DESCRIPTION OF THE PREFERRED EMBODIMENT(S)

Figure 1:
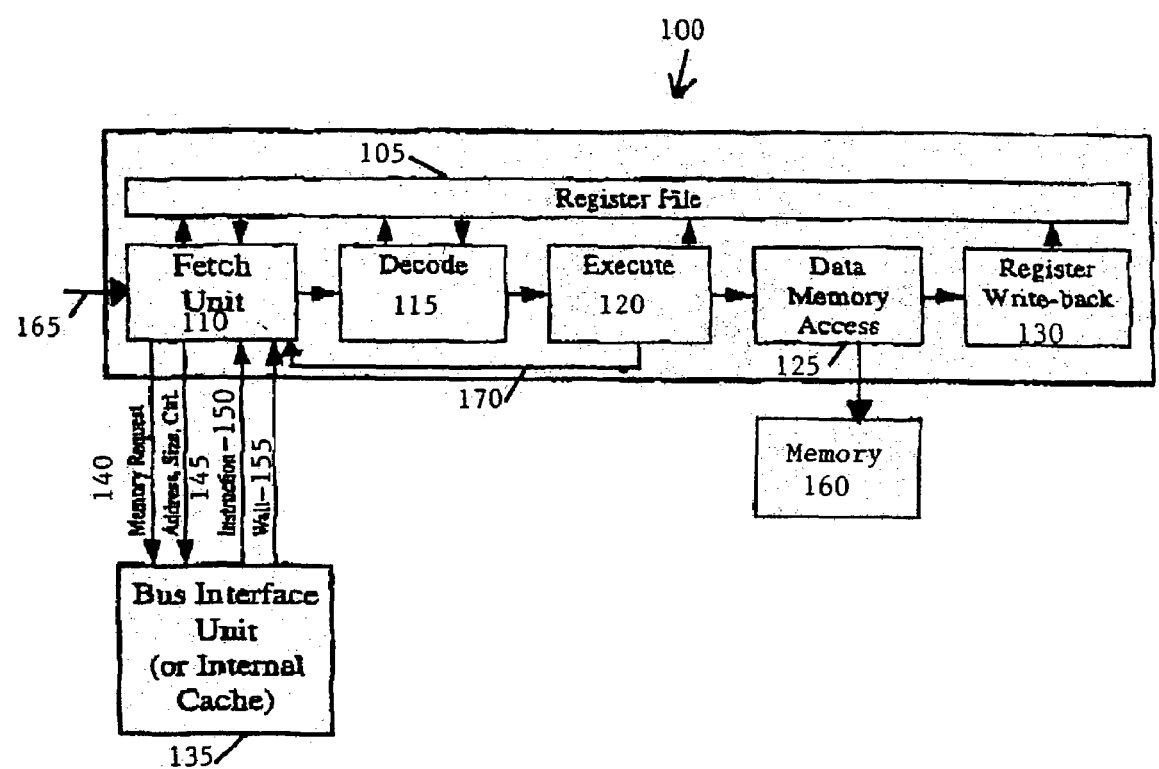
FIG. 1 is a diagram of a prior art microprocessor using pipeline processing.
Figure 2:
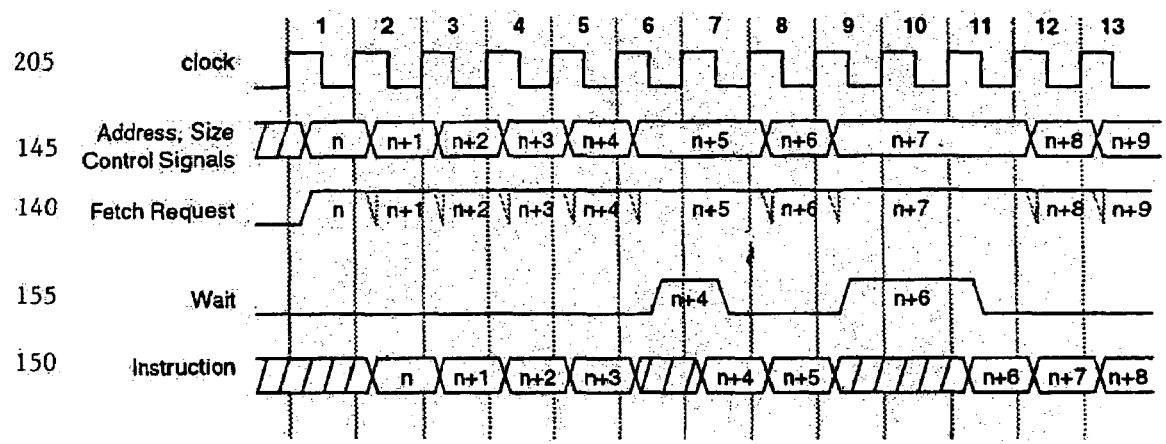
FIG. 2 is a timing diagram of the prior art microprocessor of FIG. 1 in the absence of a vector or branch instruction.
Figure 3:
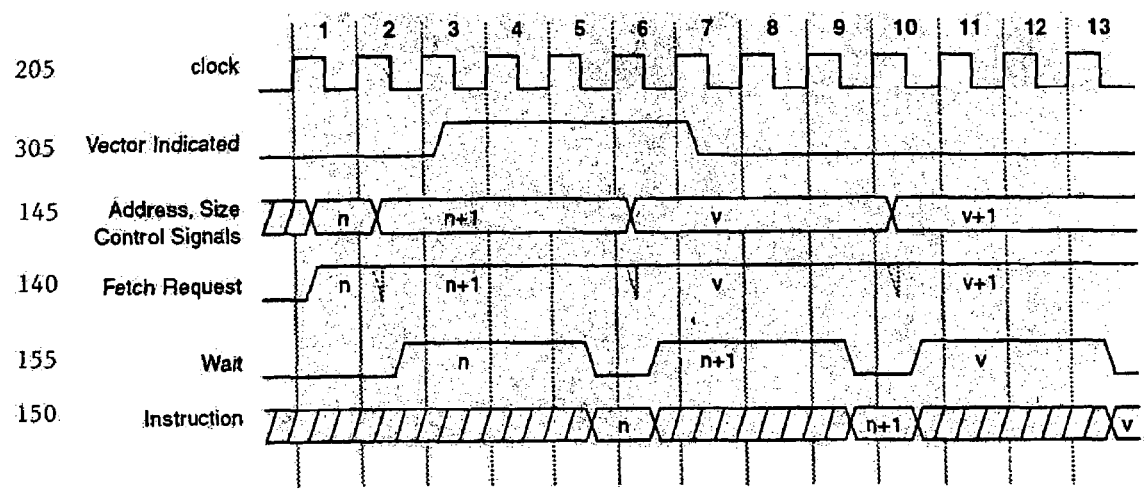
FIG. 3 is a timing diagram of the prior art microprocessor of FIG. 1 in the presence of a vector or branch instruction.
Figure 4:
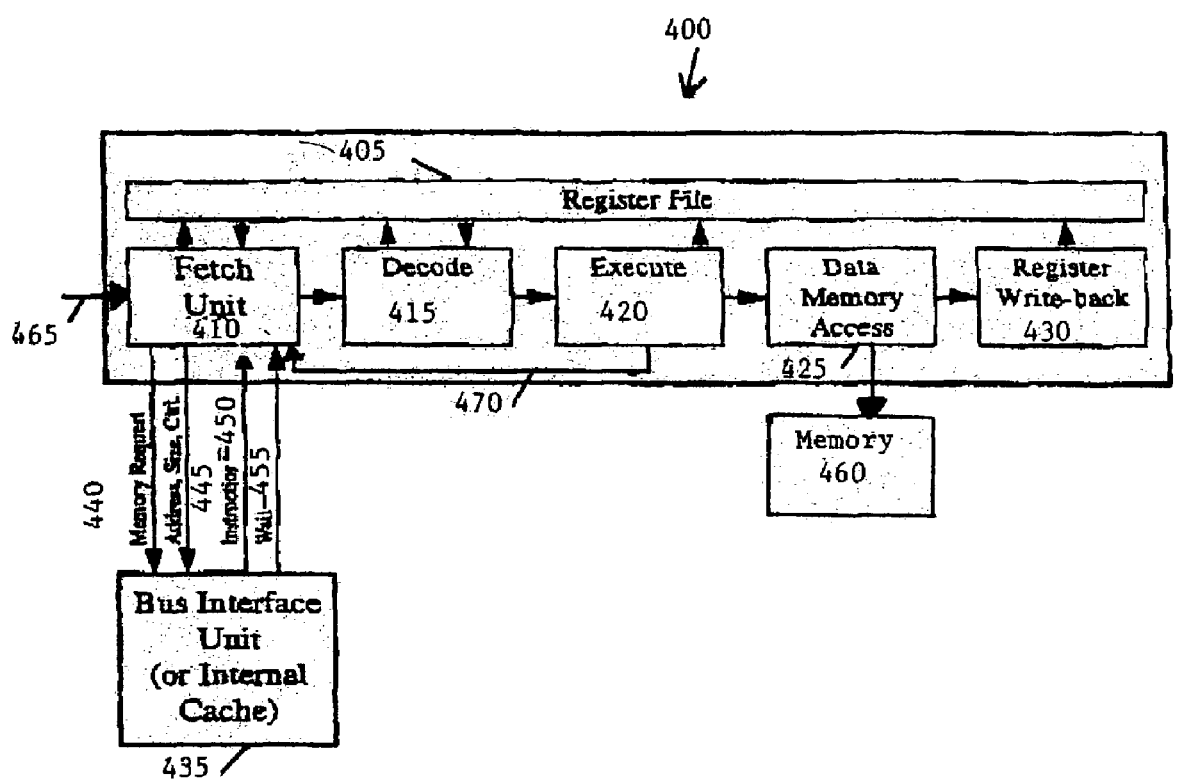
FIG. 4 illustrates a microprocessor consistent with the principles of the present invention.

FIG. 4 illustrates a microprocessor consistent with the principles of the present invention. The Fetch Unit 410 is communicatively connected to the Decode Unit 415, Vector Request signal 465 and the Branch Request The Decode Unit 415 is communicatively connected to the Execute Unit 420. The Execute Unit 420 is communicatively connected to the Data Memory Access Unit 425 and back to the Fetch Unit 410. The Data Memory Access Unit 425 is communicatively connected to the Register Write-Back Unit 430 and a Memory 460. The Register File 405 is communicatively connected to the Fetch Unit 410, Decode Unit 415, Execute Unit 420, and Register Write-Back Unit 430.

The Bus Interface Unit (BIU) 435 utilizes a Memory Request 440, also referenced as a Fetch Request 440, Address_Size_Control lines 445, an Instruction bus 450 and a Wait line 455 to communicate with the Fetch Unit 410.

The BIU 435 is a storage unit used to obtain and hold prefetched instructions. The Fetch Unit 410 requests and fetches instructions from the BIU 435. The Decode Unit 415 decodes the fetched instructions. The Execute Unit 420 executes the decoded instructions. The Data Memory Access Unit 425 accesses Memory 460. The Register Write-Back Unit 430 writes results received from the Data Memory Access Unit 425 into the Register File 405. The Vector Request signal 465 indicates when a vector has occurred. The Branch Request signal 470 indicates when a branch has occurred.

Branch signal 470 is not limited to a 1-bit signal.

The Fetch Unit 410 and the BIU 435, in the present invention, are configured to usurp a waited pipeline bus request.

Figure 5:
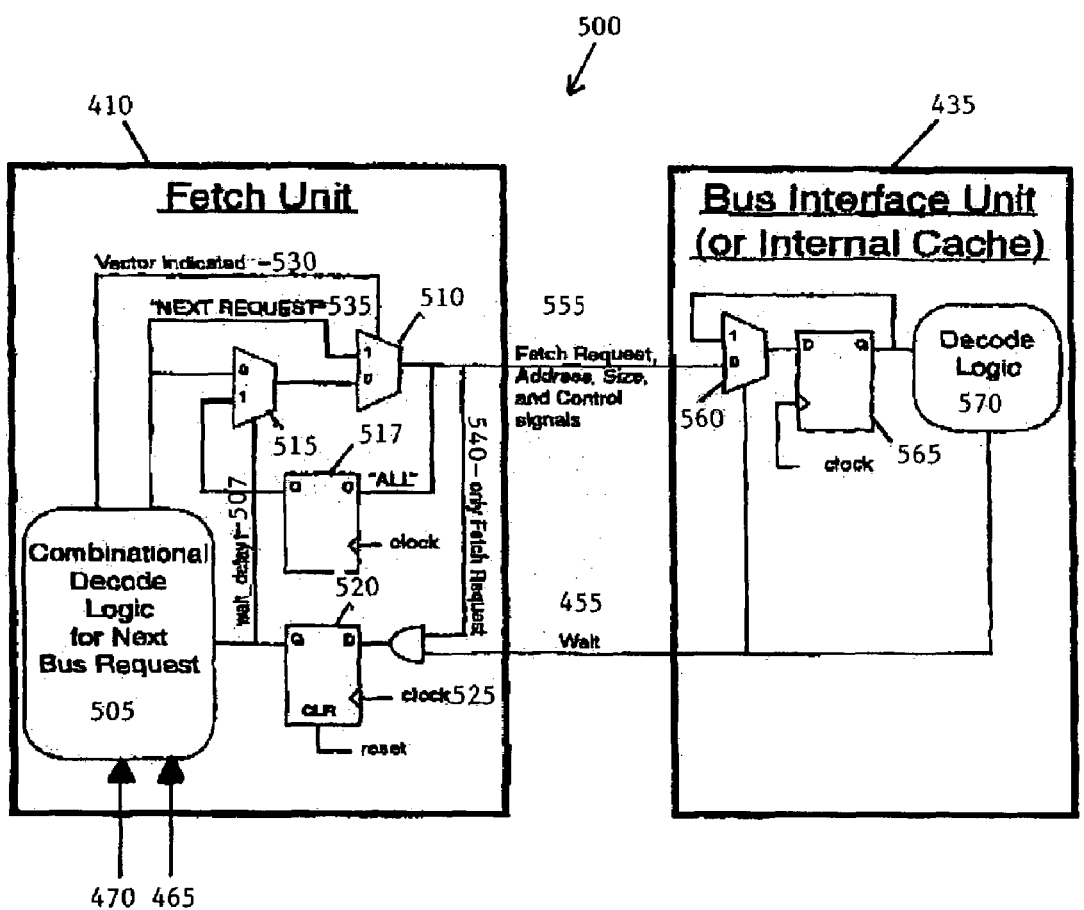
FIG. 5 illustrates a fetch unit and bus interface unit consistent with the principles of the present invention.

FIG. 5 illustrates a fetch unit and bus interface unit 500 consistent with the principles of the present invention. The Fetch Unit 410 may comprise Combinational Decode Logic 505, first multiplexer 510, second multiplexer 515, first D flip-flop 517, second D flip-flop 520, AND gate 525, and Vector Indicated signal 530, NEXT REQUEST signal 535, only FETCH REQUEST 540, Vector Request signal 465, Branch Request signal 470, Wait line 455 and Fetch Request, Address, Size and Control ("FRASC") signals 555 representing signals received from the Fetch Unit 410 by the BIU 435, as indicated earlier the FRASC signals are also referenced as the Memory Request 440, and the Address_Size_Control signals 445 of FIG. 4.

The BIU 435 comprises multiplexer 560, D flip-flop 565, and Decode Logic 570.

In the Fetch Unit 410 in FIG. 5, the Branch and Vector Request Signals 465 and 470 are communicatively connected to the Combination Decode Logic for Next Bus Request 505. The Combinational Decode Logic for Next Bus Request 505 is communicatively connected to the selection control of the first multiplexer 510 through Vector Indicated signal 530, to the "1" input of first multiplexer 510 and the "0" input of second multiplexer 515 through NEXT REQUEST signal 535, as well as to the "Q" output of second D flip-flop 520. The output of second multiplexer 515 is communicatively connected to the "0" input of first multiplexer 510. The selection control of the second multiplexer 515 is communicatively connected to the "Q" output of second D flip-flop 520 through wait_delay_1 507. The "1" input of second multiplexer 515 is communicatively connected to the "Q" output of first D flip-flop 517. The output of first multiplexer 510 is communicatively connected to the "D" input of first D flip-flop 517 and to one of the two inputs of the AND gate 525 through only FETCH REQUEST 540. The output of first multiplexer 510 is also sent across to the BIU 435 through FRASC signals 555. The AND gate 525 also is communicatively connected at its other input to a connection from the BIU 435 through Wait line 455. The output of the AND gate 525 is fed to the "D" input of second D flip-flop 520.

The communicative connection between the Combinational Decode Logic for Next Bus Request 505 and the selection of the first multiplexer 510 is the Vector Indicated signal 530. The communicative connection between the Combinational Decode Logic for Next Bus Request 505 and the "1" input of first multiplexer 510 is the NEXT REQUEST signal 535. The communicative connection between the output of the first multiplexer 510 and the input of the AND gate 525 is the only Fetch Request signal 540. The communicative connection from the output of first multiplexer 510 to the BIU 435 is the FRASC signals 555.

The Branch and Vector Request signals 465 and 470 indicate to the Combinational Decode Logic for Next Bus Request 505 that a branch or vector instruction is being requested. The Combinational Decode Logic for Next Bus Request 505 sends out a request for an instruction and it's operation would be obvious to one skilled in the art. The Decode Logic 570 serves to indicate when the Fetch Unit 410 must wait before making additional requests and it's operation would be obvious to one skilled in the art.

In the BIU 435 in FIG. 5, the FRASC signals 555 from the output of multiplexer 510 in the Fetch Unit 410 are fed to input "0" of multiplexer 560. The output of multiplexer 560 is communicatively connected to the "D" input of D flip-flop 565. The "Q" output of D flip-flop 565 is communicatively connected to the Decode Logic 570 and back to the "1" input of multiplexer 560. The Decode Logic 570 is communicatively connected to the toggle of multiplexor 560 and input into the AND gate 525 in the Fetch Unit 410. The connection from the Decode Logic 570 to an input of the AND gate 525 in the Fetch Unit 410 is known as the Wait signal 455.

Figure 6:
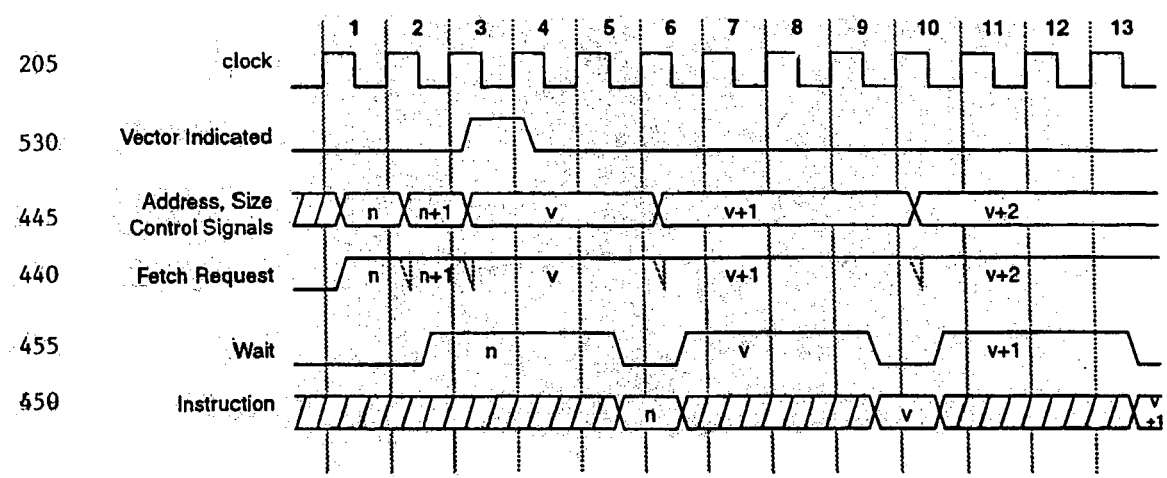
FIG. 6 illustrates a timing chart of the operation of the fetch unit and the bus interface unit of FIG. 5 of the present invention.

In FIG. 6, a timing diagram illustrating the operation of the Fetch Unit 410 and the BIU 435 of FIG. 5 is shown. At clock cycle one, a Fetch Request (Memory Request) 440 for n is made. The Combinational Decode Logic for Next Bus Request 505 produces this request. Therefore, the request for n is at the "0" input of second multiplexer 515 and the "1" input of first multiplexer 510. Wait_delay_1 507 is default low and since a Wait signal 455 has not been activated, the second multiplexer 515 will select its "0" input and output n. No vector has been indicated at clock cycle one and therefore Vector Indicated signal 530 selects the "0" input of the first multiplexer 510. Since the input "0" of first multiplexer 510 is driven by request n, request n will be the output of the first multiplexer 510.

First, D flip-flop 517 will have request n at its D input. The AND gate 525 of the Fetch Unit 410 will have a high input from the Fetch Request signal 540 and a low input from the Wait signal 455, since no wait has been indicated. Therefore, the D input of second D flip-flop 520 will receive a low input.

The multiplexer 560 of the BIU 435 selects the "0" input, since the Wait signal 455 is not active. Therefore, request n is present at "D" input of D flip-flop 565.

At clock cycle two, n+1 is requested. Request n+1 is now present at the "0" input of second multiplexer 515 and at the "1" input of first multiplexer 510. D flip-flop 517 has been clocked and request n is at its "Q" output as well as the "1" input of the second multiplexor 515. Since second D flip-flop 520 has clocked in a low, its "Q" output makes the second multiplexer 515 selects its "0" input. Therefore, the request n+1 is output to the first multiplexer 510. Since there is no Vector Indicated, the Vector Indicated signal 530 is low. Therefore, the first multiplexer 510 selects its "0" input and outputs request n+1. The "Q" output of D flip-flop 565 has clocked n as the request that changes the Wait signal 455 to high. Since the Wait signal 455 is at high, multiplexer 560 toggles high and outputs n to the "D" input of D flip-flop 565. The high Wait signal 455 results in a high input to the "D" input of second D flip-flop 520.

At clock cycle three, a vector has been indicated, therefore the Vector Indicated signal 530 is high. Instruction V is requested and the Wait signal 455 is high. The "0" input of multiplexer 515 is V. The "1" input of multiplexer 510 is V. The "1" input of the second multiplexer 515 is n+1, since the first D flip-flop 517 clocked request n+1 values from its "D" input to its "Q" output. Wait_delay_1 507 is high, since second D flip-flop 520 clocked in the previous "D" input to "Q" output. Therefore, the second multiplexer 515 selects its "1" input and outputs n+1 to the "0" input of the first multiplexer 510 which selects its "1" input and outputs V. Request V is now drives the "0" input of the multiplexer 560. However, since the Wait signal 455 is still high, the "1" input of the multiplexer 560 is selected and it outputs n. The "D" input of second D flip-flop 520 is high. The "D" input of first D flip-flop 517 is V.

At the next clock cycle (clock cycle 4), V will still be requested because the first D flip-flop 517 will drive the "1" input of the second multiplexer 515, while the wait_delay1 signal 507 will be high, which results in V driving the output of the second multiplexor 515 and this the "0" input of the first multiplexor 510. The "0" input of the first multiplexer 510 is selected because the Vector indicated signal 530 is now low, resulting the request V driving the output of the first multiplexer 510. The BIU 435 will continue to drive the Wait signal 455 active, until it has obtained the valid instruction value for the request n. The number of such wait states will vary and will be implementation specific. One who is skilled in the art will appropriately design the Wait signal 455 generation logic to guarantee proper operation.

In the fifth clock, V will still be requested and the Wait signal 455 will be low, indicating that the BIU 435 is providing the Fetch Unit 410 with the valid instruction value for request n. The "0" input of the multiplexer 560 will be selected and the D flip-flop 565 will clock in the request V. The second flip-flop 520 will clock in a low.

During the sixth clock cycle, the wait_delay1 signal 507 is low, the Vector indicated signal is low and the request V+1 is multiplexed onto the FRASC signal 555.

In the ninth clock cycle the Wait signal 455 again goes inactive, indicating that the BIU 435 is providing the Fetch Unit 410 with valid instruction value for request V.

Through the usurpation of a waited pipeline bus request, n+1 has been eliminated from the request sent to the BIU 435. Therefore, the only requests that have been fetched, as shown in FIG. 5 are n and V.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pipeline processing microprocessor comprising:
   a storage unit for storing instructions; and
   a fetch unit for pipelining requests for a first and a second instruction to said storage unit, wherein said storage unit delays accepting said request for said second instruction for processing while processing said request for said first instruction;
   wherein upon an interrupt condition, said fetch unit replaces said delayed request for said second instruction that precedes said interrupt condition with a request corresponding to the interrupt condition.

2. The pipeline processing microprocessor of claim 1, wherein said storage unit obtains said stored instructions.

3. The pipeline processing microprocessor of claim 1, wherein said fetch unit requests that said storage unit obtain said stored instructions.

4. The pipeline processing microprocessor of claim 1, wherein said storage unit delays said fetch unit.

5. The pipeline processing microprocessor of claim 1, wherein said interrupt condition is a vector instruction.

6. The pipeline processing microprocessor of claim 1, wherein said interrupt condition is a branch instruction.

7. The pipeline processing microprocessor of claim 1, wherein said microprocessor further comprises a decode unit for decoding said first instruction.

8. The pipeline processing microprocessor of claim 7, wherein said microprocessor further comprises an execute unit for executing the decoded instruction.

9. The pipeline processing microprocessor of claim 1, wherein said microprocessor further comprises a memory access unit for accessing a memory.

10. The pipeline processing microprocessor of claim 1, wherein said microprocessor further comprises a write-back unit for writing an executed result to a register file.

11. The pipeline processing microprocessor of claim 1, wherein said fetch unit comprises:
    a decode logic for generating a requested instruction to said storage unit; and
    a memory for storing said first and second instructions.

12. The pipeline processing microprocessor of claim 11, wherein said fetch until further comprises:
    a first D flip-flop coupled to a first and a second multiplexer;
    wherein an input of said first D flip-flop is coupled to an output of said first multiplexer;
    wherein an output of said first D flip-flop is coupled to an input of said second multiplexer;
    a branch request signal, a vector request signal, an output of a second D flip-flop, a selection control of said second multiplexer, another input of said second multiplexer, an input of said first multiplexer, a selection control of said first multiplexer are all coupled to said decode logic;
    wherein, said output of said second D flip-flop is also coupled to said selection control of said multiplexer;
    an output of said second multiplexer is coupled to another input of said first multiplexer;
    an output of a logic gate is coupled to an input of said second D flip-flop;
    an input of said logic gate is coupled to said output of said first multiplexer; and
    said output of said first multiplexer and another input of said logic gate are coupled to said storage unit.

13. The pipeline processing microprocessor of claim 12, wherein said logic gate is an AND gate.

14. The pipeline processing microprocessor of claim 1, wherein said storage unit comprises:
    a decode logic for updating said first instruction from said fetch unit; and
    a memory for storing said first and second instructions.

15. The pipeline processing microprocessor of claim 14, wherein said storage unit further comprises:
    an output of a multiplexer of said storage unit coupled to an input of a D flip-flop of said storage unit;
    an input of said multiplexer of said storage unit is coupled to said fetch unit; and
    an output of said D flip-flop of said storage unit is coupled to another input of said multiplexer of said storage unit and to said decode logic of said storage unit,
    wherein, said decode logic of said storage unit is coupled to said fetch unit.

16. A method of processing instructions comprising:
    storing instructions;
    pipelining requests for a first and a second instruction from said stored instructions;
    processing said request for said first instruction;
    delaying accepting said request for said second instruction for processing; and
    upon an interrupt condition, replacing the delayed pipelined request for said second instruction that precedes said interrupt condition with a pipelined request corresponding to the interrupt condition.

17. The method of processing instructions as described in claim 16, further comprising decoding fetched instructions.

18. The method of processing instructions as described in claim 17, further comprising executing the decoded instruction.

19. The method of processing instructions as described in claim 18, further comprising accessing a memory.

20. The method of processing instructions as described in claim 19,
    further comprising writing the executed result to a register file.

* * * * *